United States Patent
Lee et al.

(10) Patent No.: US 9,348,084 B2
(45) Date of Patent: May 24, 2016

(54) BACKLIGHT UNIT

(75) Inventors: Haehyung Lee, Seoul (KR); Youn Mo Jeong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 1412 days.

(21) Appl. No.: 12/949,885

(22) Filed: Nov. 19, 2010

(65) Prior Publication Data

US 2011/0149602 A1  Jun. 23, 2011

(30) Foreign Application Priority Data

Dec. 22, 2009  (KR) .................. 10-2009-0129355

(51) Int. Cl.
 G09F 13/04 (2006.01)
 G09F 13/08 (2006.01)
 F21V 8/00 (2006.01)
(52) U.S. Cl.
 CPC .............. *G02B 6/009* (2013.01); *G02B 6/0091* (2013.01); *G02B 6/0085* (2013.01)
(58) Field of Classification Search
 CPC .. G02B 6/0068; G02B 6/0028; G02B 6/0011; G02B 6/009; G02B 6/0091; G02B 6/0085; H01L 25/0753
 USPC .............. 362/97.1–97.4, 600, 610–612, 615, 362/632–634, 84, 235, 602, 249.01, 362/249.02; 349/58, 62; 257/99
 See application file for complete search history.

(56) References Cited

U.S. PATENT DOCUMENTS

| | | | |
|---|---|---|---|
| 7,490,973 B2 * | 2/2009 | Fujikawa et al. | 362/634 |
| 7,775,702 B2 * | 8/2010 | Kuroiwa | 362/634 |
| 2009/0097277 A1 * | 4/2009 | Iwasaki | 362/628 |
| 2009/0122520 A1 | 5/2009 | Kuroiwa | |
| 2011/0069510 A1 | 3/2011 | Yamashita et al. | |

FOREIGN PATENT DOCUMENTS

| | | |
|---|---|---|
| CN | 101356474 A | 1/2009 |
| JP | 2002-203418 A | 7/2002 |
| JP | 2007-250197 A | 9/2007 |
| JP | 2009-042360 A | 2/2009 |
| JP | 2009-93939 A | 4/2009 |
| JP | 2009-146904 A | 7/2009 |
| JP | 2009-199871 A | 9/2009 |
| JP | 2009-224301 A | 10/2009 |
| JP | 2009-238727 A | 10/2009 |
| JP | 2009-277641 A | 11/2009 |
| KR | 10-2007-0064761 A | 6/2007 |
| KR | 10-2008-0091667 A | 10/2008 |
| KR | 10-2009-0055148 A | 6/2009 |
| WO | WO 2009/122603 A1 | 10/2009 |
| WO | WO 2009/122604 A1 | 10/2009 |

* cited by examiner

*Primary Examiner* — Stephen F Husar
*Assistant Examiner* — Danielle Allen
(74) *Attorney, Agent, or Firm* — Birch, Stewart, Kolasch & Birch, LLP

(57) ABSTRACT

A backlight unit including a bottom sash, a light guide plate received by the bottom sash, a substrate on which a light emitting device is mounted, the light emitting device irradiating light to the light guide plate, a fixing member fixing the substrate, and a sliding moving part fixing the fixing member in such a manner that the fixing member moves with respect to the bottom sash, wherein the sliding moving part includes a sliding bar and a sliding guide which are formed in the bottom sash and the fixing member respectively.

17 Claims, 3 Drawing Sheets

BACKLIGHT UNIT

BACKGROUND

1. Field

This embodiment is generally directed to a backlight unit.

2. Description of the Related Art

In display apparatuses, there is a display apparatus which requires a backlight unit capable of generating light so as to display images. The backlight unit supplies light to a display panel including liquid crystal and the like. The backlight unit includes a light emitting device and means for effectively transferring light emitted from the light emitting device.

Since light efficiency of the backlight unit has very close relationship with the performance of the display apparatus, a large amount of research has been done to provide high quality images by using the light emitted from the backlight unit.

SUMMARY

One aspect of the present invention includes a backlight unit. The backlight unit includes a bottom sash, a light guide plate received by the bottom sash, a substrate on which a light emitting device is mounted, a fixing member fixing the substrate, and a sliding moving part fixing the fixing member in such a manner that the fixing member moves with respect to the bottom sash. The light emitting device irradiates light to the light guide plate. Since the light guide plate is able to freely expand or contract while fixed to the fixing member, the light guide plate can be prevented from being transformed, for example, bent or twisted.

DETAILED DESCRIPTION OF EMBODIMENTS

Hereinafter, a backlight unit according to an embodiment will be described in detail with reference to the accompanying drawings. In description of the embodiment, when it is mentioned that each layer (film), an area, a pattern or a structure are formed on or under a substrate, each layer (film), an area, a pad or a pattern, it means that the mention includes a case where each layer (film), an area, a pattern or structures are formed "directly" or "by interposing another layer (indirectly)". A criterion for "on/over" and "under" of each layer will be described based on the drawings. A thickness or size of each layer is magnified, omitted or schematically shown for the purpose of convenience and clearness of description. The size of each component does not necessarily mean its actual size.

Figure 1:
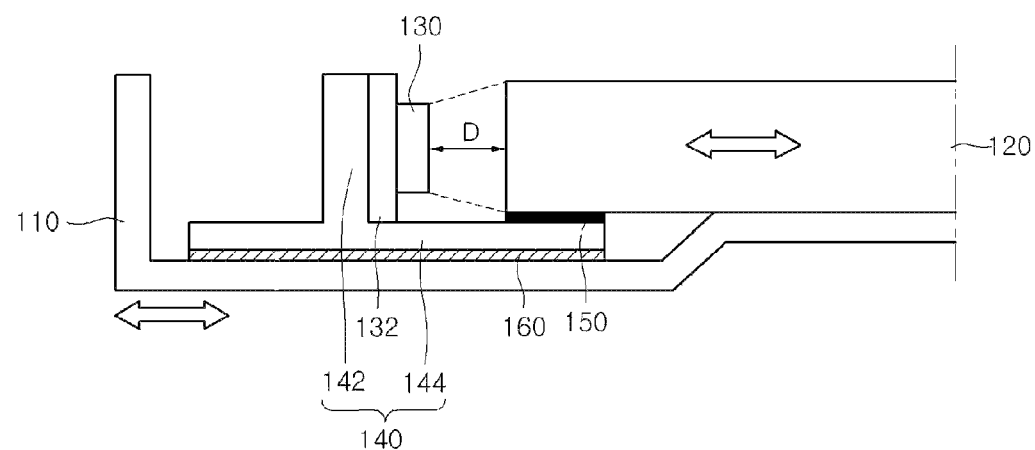
FIG. 1 is a cross sectional view showing an enlarged main part of a backlight unit according to a first embodiment.

FIG. 1 is a cross sectional view showing an enlarged main part of a backlight unit according to a first embodiment.

The backlight unit according to the first embodiment includes a bottom sash 110, a light guide plate 120 received by the bottom sash 110, a light emitting device 130 being placed on a side of the light guide plate 120 and generating light, a substrate 132 on which the light emitting device 130 is mounted, a fixing member 140 being placed within the bottom sash 110 and fixing the substrate 132 and the light guide plate 120, and a sliding moving part 160 fixing the fixing member 140 in such a manner that the fixing member 140 including the substrate 132 and the light guide plate 120 fixed thereto is able to move on the bottom sash 110. That is, the sliding moving part 160 fixes the fixing member 140 such that the fixing member 140 moves in a direction parallel with a direction in which the light guide plate 120 expands or contracts.

Here, an optical sheet may be disposed on the upper surface of the light guide plate 120. A reflective sheet may be disposed on the lower surface of the light guide plate 120.

While the bottom sash 110 may have a shape of a box having an open upper surface for housing the fixing member 140 and the light guide plate 120, etc., the bottom sash 110 may have various shapes according to its design method, without being limited to this. Such a bottom sash 110 is formed of a metallic material or a resin material. This embodiment will describe that the bottom sash 110 is formed of Al material.

The substrate 132 may include a printed circuit board (PCB), a metal core PCB (MCPCB), a flexible PCB (FPCB) or a ceramic substrate.

At least one light emitting device 130 is mounted on one side of the substrate 132. A plurality of the light emitting devices 130 may be arranged in the form of an array. The light emitting device 130 includes a light emitting diode (LED). The light emitting diode (LED) includes at least one selected from a group consisting of light emitting diodes emitting a red light, a green light, a blue light and a white light. Here, the substrate 132 on which the light emitting device 130 is mounted may have a thickness of about 3 mm, without being limited to this.

The light guide plate 120 receives light from the light emitting device 130 through a light incident surface and converts the light into plane light. The light guide plate 120 is formed of acrylic resin based material such as polymethyl metaacrylate (PMMA), polyethylene terephthlate (PET), poly carbonate (PC), cycloolefin copolymer (COC), polyethylene naphthalate (PEN) and the like. The light guide plate 120 may be thermally expanded according to a temperature. For example, when heat is generated in the light emitting device 130 or when the temperature is changed by peripheral circuits, external environments and the like, the light guide plate 120 may be expanded or contracted.

For example, when the temperature of the light emitting device 130 increases by as much as 45 degrees Celsius compared with a normal temperature, the light guide plate 120 has a thermal expansion coefficient of about 2.7 mm/m. Here, the light guide plate 120 having a size of 47 inches expands by as much as about 0.5 mm. When the sash receiving the light guide plate is also formed of Al material, the sash has a thermal expansion coefficient of 1.1 mm/m.

The fixing member 140 fixes the substrate 132 and the light guide plate 120 to a certain position. The fixing member 140 is able to radiate heat generated from the substrate 132 and the light emitting device 130 and the like by functioning as a heat pipe.

The fixing member 140 includes a fixing portion 144 and a supporting portion 142. The fixing portion 144 is placed on the bottom surface of the bottom sash 110 and fixes the light guide plate 120. The supporting portion 142 extends upward from the fixing portion 144 and supports the substrate 132 on which the light emitting device 130 is mounted.

The fixing portion 144 is seated inside the bottom sash 110 in such a manner that the fixing portion 144 is partly superposed on the light guide plate 120. An adhesive member 150 is interposed in the superposed area of the light guide plate 120 and the fixing portion 144. Therefore, a portion of the outside area of the light guide plate 120 is fixed to the fixing portion 144. Various means, such as a double-sided tape, an adhesive material and mechanical fixing devices and the like may be used as the adhesive member 150.

The supporting portion 142 is spaced at a predetermined distance from the light guide plate 120 fixed to the fixing portion 144 and is extended upward. The substrate 132 on which the array of the light emitting device 130 is fixed to the supporting portion 142, so that light from the light emitting device 130 is supplied to the light guide plate 120. Here, the substrate 132 and the light guide plate 120 are fixed to supporting portion 142 and the fixing portion 144 respectively in such a manner as to have an optimal distance "D" for minimizing optical loss, considering an optical orientation angle of the light emitting device 130. When the substrate 132, the light emitting device 130 and the light guide plate 120 have thicknesses of 2 mm to 4 mm respectively, an optimal distance "D" between the light guide plate 120 and the light emitting device 130 may be set as 1 mm to 2 mm. For example, when the substrate 132, the light emitting device 130 and the light guide plate 120 have thicknesses of 3 mm, an optimal distance "D" between the light guide plate 120 and the light emitting device 130 may be set as 1 mm.

Here, the optimal distance "D" corresponds to a gap used to fix the substrate 132 and the light guide plate 120 to the fixing member 140. It is not required any more to create an additional gap considering thermal expansion.

Accordingly, while a distance between the light emitting device and the light guide plate of a conventional backlight unit having the light emitting device and the light guide plate which are not fixed to each other is maintained to be at least 1.6 mm, the backlight unit of the embodiment of the present invention has an optimal distance "D" of 1 mm to 2 mm, more preferably 1 mm to 1.5 mm between the light emitting device 130 and the light guide plate 120. Therefore, it is possible to design the backlight unit to be thinner, and moreover possible to design a display apparatus to be thinner.

Meanwhile, a reflective area such as a reflective sheet, reflective coating and the like is formed on the fixing portion 144 interposed in a space formed between the supporting portion 142 and the light guide plate 120, so that optical loss can be prevented.

The sliding moving part 160 fixes the fixing member 140 to the bottom sash 110 such that the fixing member 140 to which the substrate 132 and the light guide plate 120 are fixed is able to slide on the bottom sash 110. The sliding moving part 160 prevents the fixing member 140 from separating from the bottom sash 110. When the light guide plate 120 expands or contracts, the sliding moving part 160 also fixes the fixing member 140 to the bottom sash 110 such that the fixing member 140 is able to slide in a direction in which the light guide plate 120 contracts or expands. Here, the sliding moving part 160 may be configured in the form of injection of grease between the fixing member 140 and the bottom sash 110. Otherwise, the sliding moving part 160 may be formed by adding another mechanical device.

As described above, the backlight unit according to the embodiment fixes the substrate 132 and the light guide plate 120 to the fixing member 140, and fixes the fixing member 140 to the bottom sash 110 in such a manner that the fixing member 240 is able to slide on the bottom sash 110. Here, when the light guide plate 120 expands or contracts in accordance with temperature variation, the fixing member 140 also slides, so that a distance between the light emitting device 130 and the light guide plate 120 which are fixed to the fixing member 140 can be uniformly maintained to an optimal distance "D". Therefore, the substrate 132 and the light guide plate 120 can be configured without allocation of enough space for thermal expansion of the light guide plate 120. As a result, it is possible to design the backlight unit to be thinner, and also ultimately possible to design a display apparatus to be thinner.

Since the light guide plate 120 is able to freely expand or contract while fixed to the fixing member 140, the light guide plate 120 can be prevented from being transformed, for example, bent or twisted.

FIGS. 2 to 5 show a structure of the sliding moving part 160 fixing the fixing member 140 and the bottom sash 110 of the backlight unit in such a manner that the fixing member 140 and the bottom sash 110 are able to slide.

Figure 2:
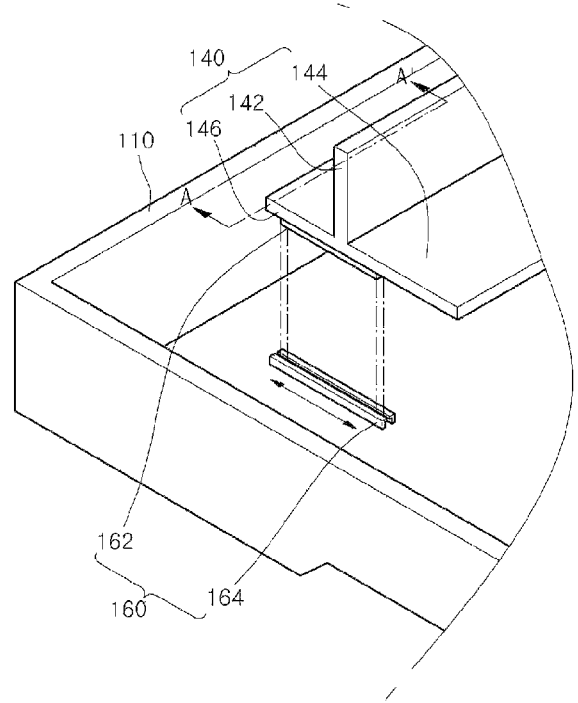
FIG. 2 is a perspective view showing an enlarged main part of a fixing member according to the first embodiment.
Figure 3:
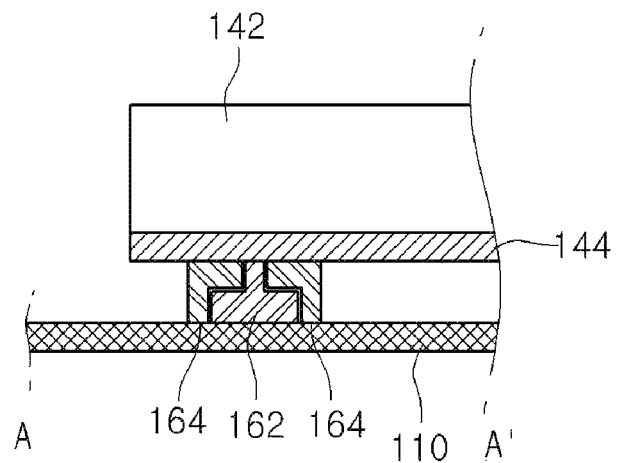
FIG. 3 is a cross sectional view of the fixing member according to the first embodiment.

FIG. 2 is a perspective view showing an enlarged main part of a fixing member 140 according to the first embodiment. FIG. 3 is a cross sectional view of the fixing member 140 according to the first embodiment. Shown is the fixing member 140 using a sliding bar 162 and a sliding guide 164.

A pair of the sliding guides 164 may be formed in the bottom sash 110. A slider may be formed on the fixing portion 144 of the fixing member 140.

Upper ends of both sides of the sliding guide 164 formed in the bottom sash 110 are bent inward to form a receiving space for receiving the sliding bar 162.

The sliding bar 162 formed in the fixing member 140 is fastened within the sliding guide 164, so that the fixing member 140 is not separated from the bottom sash 110 and moves only within the sliding guide 164.

Here, it is also possible to form a sliding bar in the bottom sash 110 and to form a sliding guide on the fixing member 140.

Figure 4:
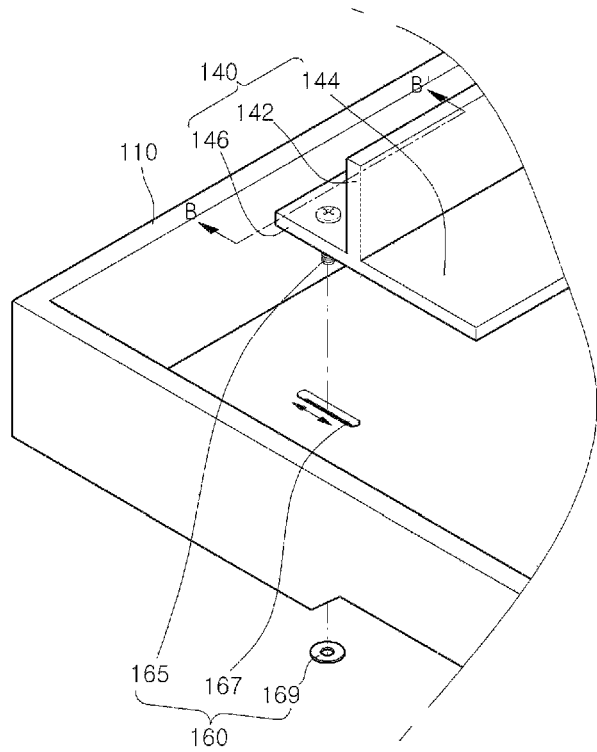
FIG. 4 is a perspective view showing an enlarged main part of a fixing member according to a second embodiment.
Figure 5:
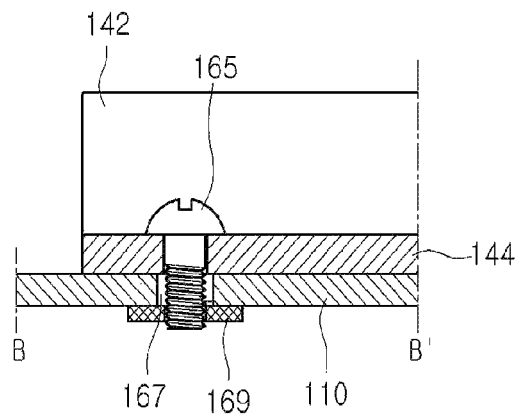
FIG. 5 is a cross sectional view of the fixing member according to the second embodiment.

FIG. 4 is a perspective view showing an enlarged main part of a fixing member according to the second embodiment. FIG. 5 is a cross sectional view of the fixing member according to the second embodiment. Shown is the fixing member 140 using a groove 167, a screw 165 and a stopper 169.

The bottom sash 110 includes the groove 167 having a predetermined length in a direction parallel with a direction in which the light guide plate 120 expands.

The screw 165 corresponding to the groove 167 is fastened to the fixing member 140. The screw 165 passes through the groove 167 of the bottom sash 110, and then is fixed by the stopper 169. That is, the screw 165 passes through the fixing member 140 and the bottom sash 110, and the stopper 169 is added to the end of the screw 165 projecting to the outside of the bottom sash 110.

The fixing member 140 is hereby fixed by the screw 165 and the stopper 169, and is not separated from the bottom sash 110. When the light guide plate 120 expands, the screw 165 moves along the groove 167, so that the fixing member 140 is able to move.

Figure 6:
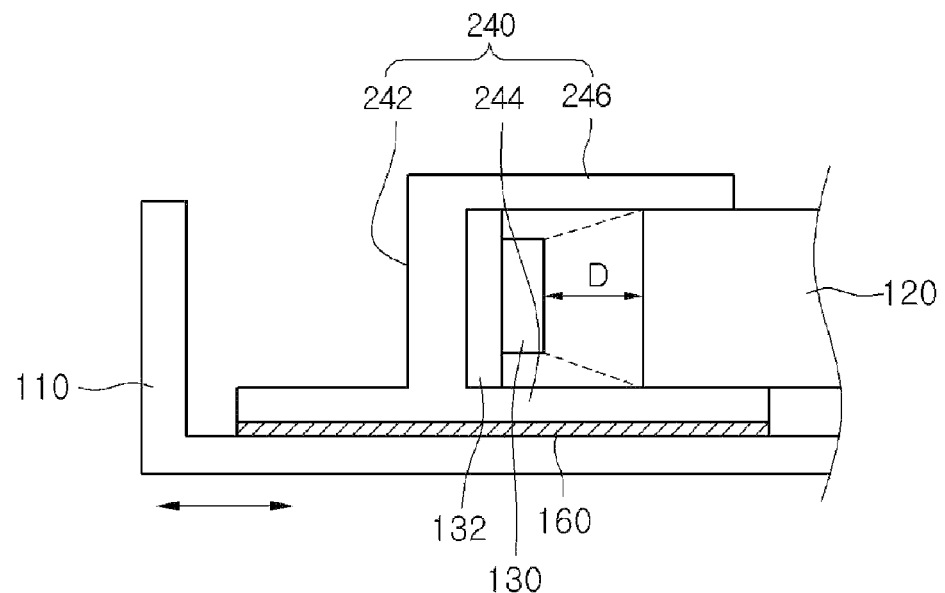
FIG. 6 is a cross sectional view showing an enlarged main part of a backlight unit according to the second embodiment.

FIG. 6 is a cross sectional view showing an enlarged main part of a backlight unit according to the second embodiment. FIG. 6 shows that the shape of the fixing member 140 of the first embodiment is changed. In description of the backlight unit according to the second embodiment of FIG. 6, the repetitive descriptions of the same configuration as that of the first embodiment will be omitted.

The backlight unit of the second embodiment includes a bottom sash 110, a light guide plate 120 seated in the bottom sash 110, a light emitting device 130 placed on a side of the light guide plate 120, a substrate 132 on which the light emitting device 130 is mounted, a fixing member 240 which has an opening and a receiving space for receiving the substrate 132 and fixes at least a portion of the light guide plate 120 through the opening, and a sliding moving part 160 which fixes the fixing member 240 in such a manner that the fixing member 240 is able to move on the bottom sash 110. Here, an optical sheet may be disposed on the upper surface of the light guide plate 120. A reflective sheet may be disposed on the lower surface of the light guide plate 120.

The fixing member 240 fixes the substrate 132 and the light guide plate 120 to a certain position. The fixing member 240 is able to radiate heat generated from the substrate 132 and the light emitting device 130 and the like by functioning as a heat pipe.

The fixing member 240 has an opening and a receiving space for receiving the substrate 132. One end of the light guide plate 120 is inserted and fixed into the opening.

The fixing member 240 includes a supporting portion 242 which supports the substrate 132 on which the light emitting device 130, a top fixing portion 246 and a bottom fixing portion 244 which are bent from the top and the bottom of the supporting portion 242 respectively and fix the edges of the top and the bottom of the light guide plate 120. The top fixing portion 246, the supporting portion 242 and the bottom fixing portion 244 may have their full section of a rectangle having one side of an opening for receiving the light guide plate 120.

The supporting portion 242 of the fixing member 240 receives the substrate 132 to which the light emitting device 130 is mounted. The light guide plate 120 is inserted and fixed between the top fixing portion 246 and the bottom fixing portion 244. If a force allowing the top fixing portion 246 and the bottom fixing portion 244 to sufficiently fix the light guide plate 120 is given.
a means for fixing the light guide plate 120, such as a double-sided tape, an adhesive material and mechanical fixing devices and the like can be omitted.

Meanwhile, the light guide plate 120 inserted into the fixing member 240 may be arranged in such a manner as to have a predetermined spaced distance from the array of the light emitting device 130 mounted on the supporting portion 242. It is preferable that the light guide plate 120 is arranged and fixed in such a manner as to have an optimal distance "D" for minimizing optical loss, considering light extraction angle of the light emitting device 130. When the substrate 132, the light emitting device 130 and the light guide plate 120 have thicknesses of 3 mm respectively, an optimal distance "D" between the light guide plate 120 and the light emitting device 130 may be set as 1 mm to 2 mm. Here, the optimal distance "D" corresponds to a gap used to fix the substrate 132 and the light guide plate 120 to the fixing member 240. It is not required any more to create an additional gap considering thermal expansion.

Accordingly, while a distance between the light emitting device and the light guide plate of a conventional backlight unit having the light emitting device and the light guide plate which are not fixed to each other is maintained to be at least 1.6 mm, the backlight unit of the embodiment of the present invention has an optimal distance "D" of 1 mm to 2 mm, more preferably 1 mm to 1.5 mm between the light emitting device 130 and the light guide plate 120. Therefore, it is possible to design the backlight unit to be thinner, and moreover possible to design a display apparatus to be thinner.

Meanwhile, a reflective area such as a reflective sheet, reflective coating and the like is formed on the top fixing portion 246 and the bottom fixing portion 244 interposed in a space formed between the supporting portion 242 and the light guide plate 120, so that light efficiency can be also improved.

The sliding moving part 160 fixes the fixing member 240 to the bottom sash 110 such that the fixing member 240 to which the substrate 132 and the light guide plate 120 are fixed is able to slide on the bottom sash 110. The sliding moving part 160 prevents the fixing member 240 from separating from the bottom sash 110. When the light guide plate 120 expands or contracts, the sliding moving part 160 also fixes the fixing member 240 to the bottom sash 110 such that the fixing member 240 is able to slide in a direction in which the light guide plate 120 contracts or expands. Here, the sliding moving part 160 may be configured in the form of injection of grease between the fixing member 240 and the bottom sash 110. Otherwise, the sliding moving part 160 may be formed by adding another mechanical device.

As described above, the backlight unit according to the embodiment fixes the substrate 132 and the light guide plate 120 to the fixing member 240, and fixes the fixing member 240 to the bottom sash 110 in such a manner that the fixing member 140 is able to slide on the bottom sash 110.

Here, when the light guide plate 120 expands or contracts in accordance with temperature variation, the fixing member 240 also slides, so that a distance between the light emitting device 130 and the light guide plate 120 which are fixed to the fixing member 240 can be uniformly maintained to an optimal distance "D" of 1 mm to 2 mm.

Accordingly, it is possible to improve the light efficiency by preventing light drain.

Further, the substrate 132 and the light guide plate 120 can be configured without allocation of enough space for thermal expansion of the light guide plate 120. As a result, it is possible to design the backlight unit to be thinner, and also ultimately possible to design a display apparatus to be thinner.

Since the light guide plate 120 is able to freely expand or contract while fixed to the fixing member 240, the light guide plate 120 can be prevented from being transformed, for example, bent or twisted.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:
1. A backlight unit comprises:
a bottom sash;
a light guide plate received by the bottom sash;
a substrate on which a light emitting device is mounted, the light emitting device irradiating light to the light guide plate;

a fixing member fixing the substrate and the light guide plate; and a sliding moving part fixing the fixing member in such a manner that the fixing member moves with respect to the bottom sash, wherein the sliding moving part comprises a sliding bar and a sliding guide which are formed in the bottom sash and the fixing member respectively, wherein the sliding guide comprises a pair of sliding guides, wherein the pair of sliding guides forms a receiving space, wherein the sliding bar is coupled to the receiving space and moves along the pair of sliding guides, and wherein the fixing member is not separated from the bottom sash.

2. The backlight unit of claim 1, wherein the bottom sash is formed of at least one of a resin material and a metallic material including Al and the like.

3. The backlight unit of claim 1, wherein the light guide plate is formed of one of polymethyl metaacrylate (PMMA), polyethylene terephthlate (PET), poly carbonate (PC), cycloolefin copolymer (COC) and polyethylene naphthalate (PEN).

4. The backlight unit of claim 1, wherein the thickness of the light guide plate is 2 mm to 4 mm.

5. The backlight unit of claim 1, wherein the light emitting device comprises at least one selected from a group consisting of light emitting diodes emitting a red light, a green light, a blue light and a white light.

6. The backlight unit of claim 1, wherein the fixing member comprises a heat pipe.

7. The backlight unit of claim 1, wherein the fixing member comprises a fixing portion and a supporting portion, and wherein the fixing portion is placed on the bottom surface of the bottom sash and fixes the light guide plate, and wherein the supporting portion extends upward from the fixing portion and supports the substrate in a side area of the light guide plate.

8. The backlight unit of claim 7, further comprising an adhesive member interposed in a superposed area of the fixing portion and the light guide plate.

9. The backlight unit of claim 8, wherein the adhesive member comprises any one of a double-sided tape, an adhesive material and a mechanical fixing device.

10. The backlight unit of claim 7, wherein a reflective area is formed on the fixing portion interposed between the supporting portion and the light guide plate.

11. The backlight unit of claim 1, wherein the fixing member comprises:

a supporting portion supporting the substrate;

a top fixing portion being bent from the top of the supporting portion and fixing a portion of the area of the top surface of the light guide plate; and a bottom fixing portion being bent from the bottom of the supporting portion and fixing a portion of the area of the bottom surface of the light guide plate.

12. The backlight unit of claim 11, wherein the top fixing portion, the supporting portion and the bottom fixing portion of the fixing member have their full section of a rectangle having one side of an opening for receiving the light guide plate.

13. The backlight unit of claim 11, wherein a reflective area is formed on the top fixing portion and the bottom fixing portion interposed in a space formed between the supporting portion and the light guide plate.

14. The backlight unit of claim 7, wherein a distance between the light emitting device and the light guide plate is set as 1 mm to 1.5 mm.

15. The backlight unit of claim 1, wherein the sliding moving part comprises grease injected between the bottom sash and the fixing member.

16. A backlight unit comprising:

a bottom sash;

a light guide plate received by the bottom sash;

a substrate on which a light emitting device is mounted, the light emitting device irradiating light to the light guide plate;

a fixing member fixing the substrate and the light guide plate; and a sliding moving part fixing the fixing member in such a manner that the fixing member moves with respect to the bottom sash, wherein the bottom sash includes a groove having a predetermined length in a direction parallel with a direction in which the light guide plate expands, and wherein the sliding moving part comprises:

a screw fixed to the fixing member and inserted into the groove of the bottom sash; and a stopper fastened to the end of the screw projecting from the bottom sash.

17. The backlight unit of claim 11, wherein a distance between the light emitting device and the light guide plate is set as 1 mm to 1.5 mm.

* * * * *